United States Patent
Ikeda et al.

(10) Patent No.: US 9,904,880 B2
(45) Date of Patent: Feb. 27, 2018

(54) PRINTING CONTROL DEVICE AND METHOD ACCORDING TO SHEET SIZES

(71) Applicant: FUJI XEROX CO., LTD., Tokyo (JP)

(72) Inventors: Yutaka Ikeda, Yokohama (JP); Issei Matsushita, Yokohama (JP); Masayuki Iwasawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/256,748

(22) Filed: Sep. 6, 2016

(65) Prior Publication Data

US 2017/0262743 A1 Sep. 14, 2017

(30) Foreign Application Priority Data

Mar. 8, 2016 (JP) ................................ 2016-044900

(51) Int. Cl.
- *G03G 15/00* (2006.01)
- *G06K 15/00* (2006.01)
- *G06F 3/00* (2006.01)
- *G06F 3/12* (2006.01)

(52) U.S. Cl.
CPC ......... *G06K 15/4065* (2013.01); *G03G 15/50* (2013.01); *G03G 15/5095* (2013.01); *G06F 3/1296* (2013.01); *G06K 15/403* (2013.01)

(58) Field of Classification Search
CPC ............... G03G 15/50; G03G 15/5029; G03G 15/5095; G03G 15/6538; G03G 15/6547; G03G 2215/00734; G03G 2215/0089; G06K 15/4065; G06K 15/403; G06F 3/1296

USPC .................................................... 399/82, 404
See application file for complete search history.

(56) References Cited

U.S. PATENT DOCUMENTS

| | | | | |
|---|---|---|---|---|
| 5,316,279 A | * | 5/1994 | Corona | ................... B65H 31/10 270/1.01 |
| 2009/0304409 A1 | * | 12/2009 | Matoba | .............. H04N 1/00413 399/82 |

FOREIGN PATENT DOCUMENTS

| | | | | | |
|---|---|---|---|---|---|
| JP | 09104144 | A | * | 4/1997 | |
| JP | H10119364 | | | 5/1998 | |
| JP | 11189351 | A | * | 7/1999 | ............ B41J 11/008 |
| JP | 2002234664 | A | * | 8/2002 | |
| JP | 2004243581 | A | * | 9/2004 | |

\* cited by examiner

*Primary Examiner* — Robert Beatty
(74) *Attorney, Agent, or Firm* — JCIPRNET

(57) ABSTRACT

There is provided a printing control device. A setting unit sets a sorting priority mode that causes a printing device to perform printing using a recording sheet in which the difference from the recording sheet size designated by a current print job mounted on the printing device is within a predetermined range, in a case where a recording sheet with a same size as the recording sheet designated by the current print job is not mounted on the printing device, and a recording sheet which has a recording sheet size that is printable without reducing the printing range, and for which the difference from the size of the recording sheet designated by the current print job is within a predetermined range is mounted on the printing device in a sheet feed direction different from the sheet feed direction of the recording sheet of the previous print job.

6 Claims, 8 Drawing Sheets

FIG. 6

| | SHEET FEED CONFIGURATION OF PRINTING DEVICE | SORTING PRIORITY | SORTABLE SHEET DETERMINATION RESULTS | JOB | INFORMATION OF PREVIOUS JOB | COMMAND OUTPUT |
|---|---|---|---|---|---|---|
| (EXAMPLE 1) CASE WHERE BOTH PORTRAIT AND LANDSCAPE ARE REGULAR | TRAY 1 A4 LANDSCAPE TRAY 2 A4 PORTRAIT TRAY 3 B4 PORTRAIT | OFF | TRAY 1: A4 LANDSCAPE TRAY 2: A4 PORTRAIT OUTPUT SHEET SIZE A4 | JOB 1 | A4 PORTRAIT | PRINTING INSTRUCTION AT A4 LANDSCAPE |
| | | | | JOB 2 | A4 LANDSCAPE | PRINTING INSTRUCTION AT A4 PORTRAIT |
| (EXAMPLE 2) CASE WHERE ONLY PORTRAIT IS REGULAR | TRAY 1 B5 LANDSCAPE (257 x 182) TRAY 2 IRREGULAR (182 x 257) TRAY 3 A4 PORTRAIT | OFF | TRAY 1: B5 LANDSCAPE TRAY 2: 182 x 257 (CORRESPONDS TO B5 PORTRAIT) OUTPUT SHEET SIZE B5 | JOB 1 | B5 LANDSCAPE | PRINTING INSTRUCTION AT 182 x 257 (CORRESPONDS TO B5 PORTRAIT) |
| | | | | JOB 2 | 182 x 257 (CORRESPONDS TO B5 PORTRAIT) | PRINTING INSTRUCTION AT B5 LANDSCAPE |

FIG. 7

| | SHEET FEED CONFIGURATION OF PRINTING DEVICE | SORTING PRIORITY | SORTABLE SHEET DETERMINATION RESULTS | JOB | INFORMATION OF PREVIOUS JOB | COMMAND OUTPUT |
|---|---|---|---|---|---|---|
| (EXAMPLE 3) | TRAY 1 A4 LANDSCAPE<br>TRAY 2 Letter LANDSCAPE<br>TRAY 3 A5 PORTRAIT | ON | TRAY 1: A4 LANDSCAPE<br>TRAY 2 Letter LANDSCAPE<br>OUTPUT SHEET SIZE A4 | JOB 1 | A4 LANDSCAPE | PRINTING INSTRUCTION AT Letter LANDSCAPE |
| | | | | JOB 2 | Letter LANDSCAPE | PRINTING INSTRUCTION AT A4 LANDSCAPE |
| (EXAMPLE 4) | TRAY 1 B5 LANDSCAPE (257 x 182)<br>TRAY 2 IRREGULAR (260 x 190)<br>TRAY 3 A4 PORTRAIT | ON | TRAY 1: B5 LANDSCAPE<br>TRAY 2: 260 x 190<br>OUTPUT SHEET SIZE B5 | JOB 1 | B5 LANDSCAPE | PRINTING INSTRUCTION AT 260 x 190 |
| | | | | JOB 2 | 260 x 190 | PRINTING INSTRUCTION AT B5 LANDSCAPE |

PRINTING CONTROL DEVICE AND METHOD ACCORDING TO SHEET SIZES

CROSS-REFERENCE TO RELATED APPLICATIONS

This application is based on and claims priority under 35 USC 119 from Japanese Patent Application No. 2016-044900 filed Mar. 8, 2016.

TECHNICAL FIELD

The present invention relates to a non-transitory computer readable medium, a printing control device, a printing control method and a printing system.

RELATED ART

In an office or the like, frequently, plural terminals (personal computers) are connected by a network such as a local area network (LAN) to one printing device (printer) and plural users share and use the one printing device. At this time, because recording sheets pertaining to the print jobs of plural users are output to one printing device, it is desirable for the recording sheets to be sorted and output so that who printed the job and for which print job is understood.

SUMMARY

According to an aspect of the embodiments of the present invention, there is provided a non-transitory computer readable medium storing a printing control program causing a computer to execute functions of: a printing information acquiring unit that acquires printing information that includes a size of a recording sheet from a print job; a sheet information acquiring unit that acquires information on a size and a sheet feed direction of the recording sheet mounted on the printing device and information on a size and a sheet feed direction of the recording sheet output from the printing device according to a previous print job from the printing device; and a setting unit that sets a sorting priority mode that causes the printing device to perform printing using a recording sheet in which the difference from the recording sheet size designated by a current print job mounted on the printing device is within a predetermined range, in a case where a recording sheet with a same size as the recording sheet designated by the current print job is not mounted on the printing device, and a recording sheet which has a recording sheet size that is printable without reducing the printing range, and for which the difference from the size of the recording sheet designated by the current print job is within a predetermined range is mounted on the printing device in a sheet feed direction different from the sheet feed direction of the recording sheet of the previous print job.

BRIEF DESCRIPTION OF THE DRAWINGS

Exemplary embodiments of the present invention will be described in detailed based on the following figures, wherein:

FIG. 6 is a drawing illustrating an example of a sheet feed configuration;

FIG. 7 is a drawing illustrating another example of the sheet feed configuration.

DETAILED DESCRIPTION

Exemplary Embodiment (Configuration of Printing System)

Figure 1:
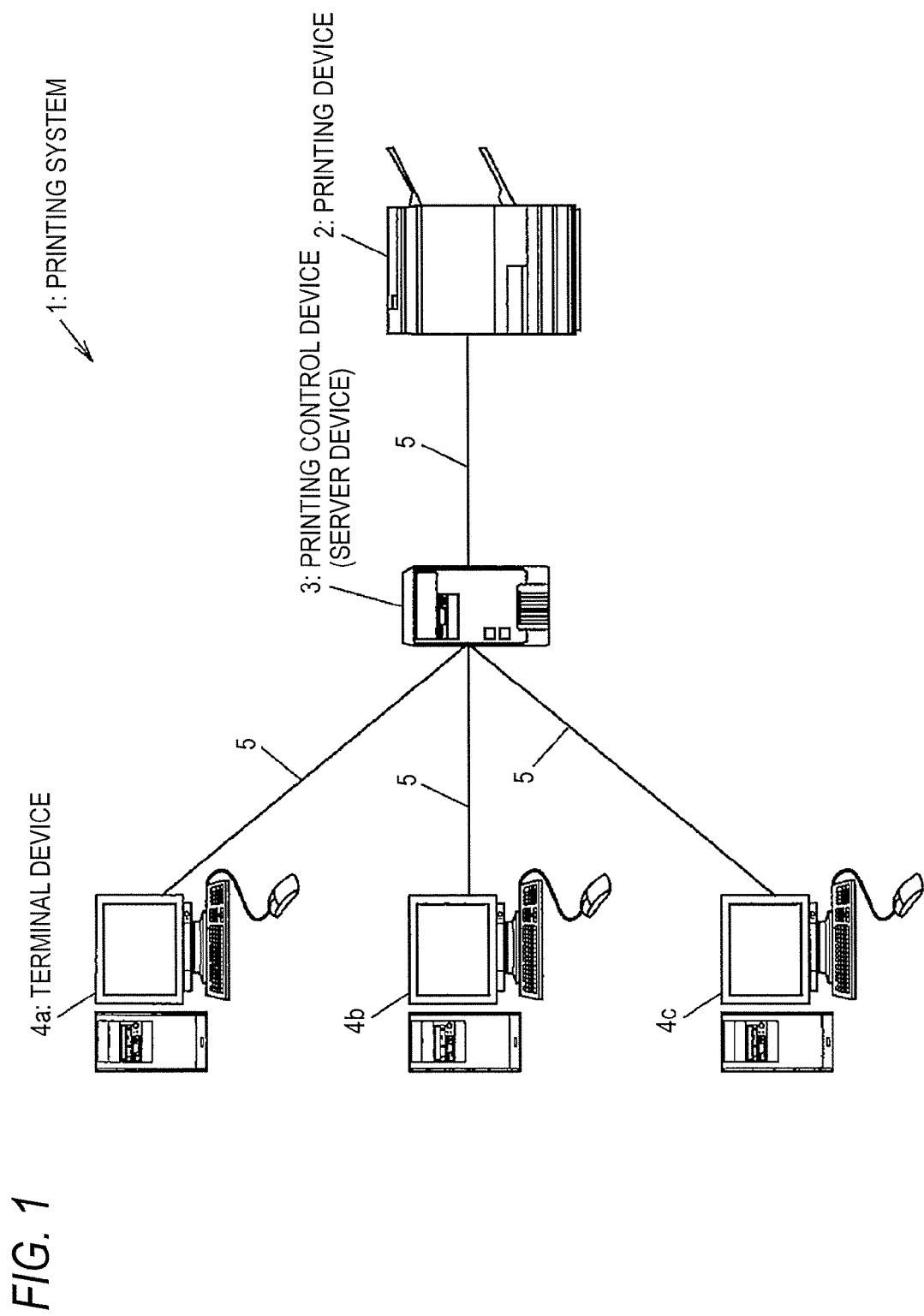
FIG. 1 is a schematic diagram illustrating an example of a configuration of a printing system according to an exemplary embodiment.

FIG. 1 is a schematic diagram illustrating an example of a configuration of a printing system according to an exemplary embodiment.

A printing system 1, as an example of the exemplary embodiment, is formed by a printing control device (server device) 3 being connected to a printing device (printer) 2 via a transmission medium 5, and plural terminal devices 4a, 4b, and 4c being connected to the printing control device 3 via the transmission medium 5. In the example illustrated in FIG. 1, although three terminal devices 4a, 4b, and 4c are connected to the printing control device 3, the number of terminal devices connected to the printing control device 3 is not limited to three.

It is possible to use a wired medium, such as an electric cable and an optical cable, and a wireless medium such as infrared rays, and electric waves as the transmission medium 5.

(Printing Device)

The printing device 2 has the function of performing printing on the recording sheet in printing conditions in which the printing data sent from the printing control device 3 is designated, and outputting the printed recording sheet. The printing device 2 is provided with plural sheet trays, and it is possible to mount plural different sizes of recording sheet in different sheet feed directions.

(Printing Control Device)

Although a detailed configuration will be described later, the printing control device 3 is an information processing device provided with electronic components such as a central processing unit (CPU) that includes a function for processing information or memory and is configured by, for example, a personal computer. The printing control device 3 receives print job information that includes the printing data, the size of the recording sheet and the like from the terminal devices 4a, 4b, and 4c connected thereto, receives information on the recording sheet printed by the printing device 2 and the recording sheet mounted on the printing device 2 from the printing device 2, sets the sortable sheet feed configuration, generated the printing data and the printing control information, and sends the generated data and information to the printing device 2.

(Terminal Device)

The terminal devices 4a, 4b, and 4c communicate with the printing control device 3 via the transmission medium 5. The terminal devices 4a, 4b, and 4c are formed by personal computers and are provided with an operation unit such as a keyboard, mouse, or touch pad for operation input, a display such as a liquid crystal display, and a controller such as a CPU or memory. The terminal devices 4a, 4b, and 4c send a request to the printing control device 3 in response to an operation by a user, receive a response with respect to the request, and display results in which the received content is processed by the controller on the display.

The printing system 1 includes the terminal devices 4a, 4b, and 4c to which plural users send print requests, and a printing control device 3 as higher order host computer (server device) that controls the terminals devices, and the printing control device 3 that is a higher order host is operated by a manager. Setting of the sorting priority mode, described later, is performed by the manager.

(Configuration of Printing Control Device)

Figure 2:
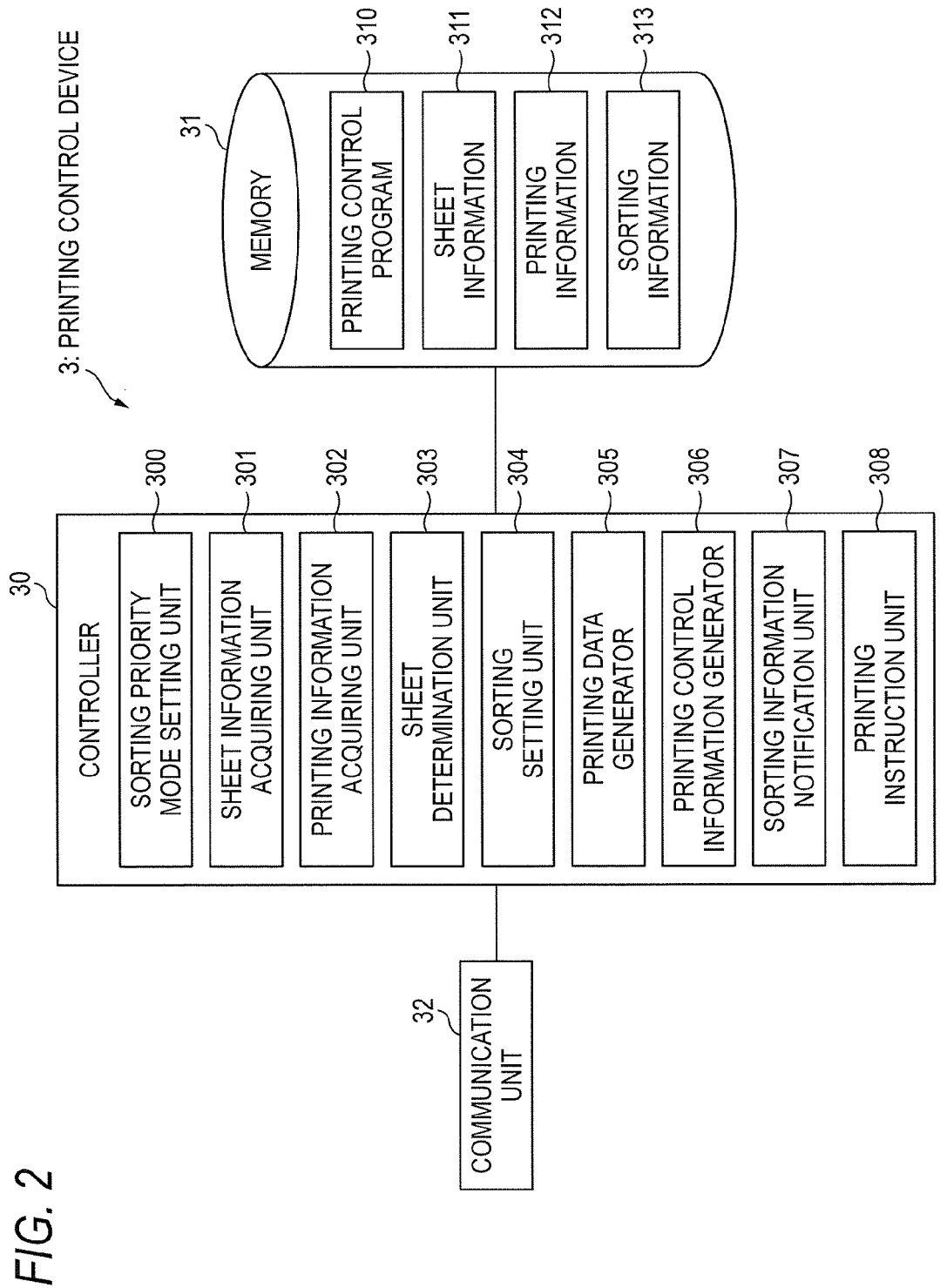
FIG. 2 is a block diagram illustrating an example of a configuration of the printing control device according to the exemplary embodiment.

FIG. 2 is a block diagram illustrating an example of a configuration of the printing control device 3 according to the exemplary embodiment.

The printing control device 3 is provided with a controller 30 that is formed from a CPU or the like, and that controls each portion and executes various programs, a memory 31 as an example of a storage device that is formed from a recording medium such as a hard disk drive (HDD) or a flash memory and that stored information, and a communication unit 32 that communicates with the outside via the transmission medium 5.

The controller 30 functions as a sorting priority mode setting unit 300, a sheet information acquiring unit 301, a printing information acquiring unit 302, a sheet determining unit 303, a sorting setting unit 304, a printing data generator 305, a printing control information generator 306, a sorting information notification unit 307, a printing instruction unit 308, and the like by executing a printing control program 310, described later.

The sorting priority mode setting unit 300 sets a mode that prioritizes permitting and sorting recording sheets for which a difference in the sizes of the recording sheets designated by the print job is within a predetermined range when performing sorting of the recording sheets by switching the sheet feed direction of the recording sheet between the longitudinal direction and the lateral direction for each predetermined printing unit in the printing device 2. Here, although the expression predetermined printing unit in the printing device 2 basically indicates for each print job for which each user outputs instructions from the terminal devices 4a, 4b, and 4c, for each portion may be indicated in a case where plural printed matters are included in one print job.

The sheet information acquiring unit 301 acquires information on the size and sheet feed direction of the recording sheet mounted on the sheet tray (sheet feed port) of the printing device 2 and information on the size and sheet feed direction of the recording sheet output by the print job performed previously by the printing device 2 from the printing device 2, and stores the acquired information as sheet information 311 in the memory 31.

The printing information acquiring unit 302 receives the printing instructions transmitted by each user through the terminal devices 4a, 4b, and 4c, acquires the print job information that includes the recording sheet size designated by the user, and stores the acquired information as printing information 312 in the memory 31.

The sheet determining unit 303 determines whether the size of the recording sheet designated by the user with the current print job and the size of the recording sheet output by the printing device 2 with the previously performed print job are the same. The sheet determining unit 303 determines the sheet feed direction of the recording sheet mounted on the printing device 2.

The sorting setting unit 304 performs setting of the sorting so that the recording sheet used by current print job has a sortable sheet feed configuration to create a distinction even if the recording sheets of plural print jobs are overlapped on one exit tray in the printing device 2 based on the determination results of the sheet determining unit 303. There are various setting methods in the setting of the sorting, and the sorting setting method will be simply described next.

First, in a case where the sorting priority mode is set by the sorting priority mode setting unit 300, for example, in a case where the size of the recording sheet designated by the current print job is the same as the size of the recording sheet output by the previous print job, sorting is set by attaining a sortable sheet feed configuration for the recording sheet mounted on the sheet tray with respect to the recording sheet of the previous print job in a case where a recording sheet with the same size as the recording sheet designated by the current print job is mounted on the sheet tray of the printing device 2 with a different sheet feed direction to the sheet feed direction of the recording sheet of the previous print job.

In a case where the sorting priority mode is set, for example, in a case where the size of the recording sheet designated by the current print job is the same as the size of the recording sheet output by the previous print job, although a recording sheet with the same size as the recording sheet designated by the current print job is not mounted on the sheet tray of the printing device 2, sorting is set by attaining a sortable sheet feed configuration for the recording sheet mounted on the sheet tray in a case where a recording sheet with a printable size without reducing the printing range and for which the difference from the recording sheet size designated by the current print job is within a predetermined range is mounted on the sheet tray of the printing device 2 in a sheet feed direction different from the sheet feed direction of the recording sheet of the previous print job.

The recording sheet for which the difference from the size of the recording sheet is within a predetermined range with respect to a given sheet is determined with reference to the respective errors compared to the longitudinal lengths and the lateral lengths of the respective recording sheets. For example, determination of whether the average error of the longitudinal and the lateral errors is within a predetermined range may be performed. For example, Letter size (215.9× 279.4 millimeters), in contrast to A4 size (210×297 millimeters), the error between the lateral lengths is an average of 6 millimeters, the error in the longitudinal lengths is an average of 18 millimeters and the average of the respective errors in the longitudinal lengths and longitudinal lengths is 12 millimeters. Since B5 size is (182×257 millimeters), the error in the lateral lengths A4 size and B5 size is 28 millimeters, the error in the longitudinal lengths is 40 millimeters, and the average of the longitudinal and lateral errors is 34 millimeters. For example, if the predetermined range is made within 20 millimeters, although A4 and Letter sizes are in the predetermined range, A4 and B5 are not within the predetermined range. A predetermined range within 20 millimeters is an example, and other values may be used without limitation thereto. Furthermore, the value of the range may be changed according to a basic size that is compared.

In a case where sorting priority mode is set, sorting is set by the designated recording sheet attaining a sortable sheet feed configuration in a case where the size of the recording sheet set by the current print job differs from the size of the recording sheet output by the previous print job.

Next, in a case where the sorting priority mode is not set by the sorting priority mode setting unit 300, for example, in a case where a print job in which the user designates a recording sheet with a standard size is continuously designated, the recording sheet with a standard size attains a sortable sheet feed configuration, thereby setting the sorting in a case where recording sheets with a standard size are mounted on the sheet tray of the printing device 2 in both of the longitudinal and lateral sheet feed directions.

It should be noted that the wording "recording sheet with a standard size" is a recording sheet in which the longitudinal and lateral sizes of the sheet are determined, in Japan, by the JIS standard to be (210×297 millimeters) if A4 and (257×364 millimeters) if B4, and is referred to as a "regular sheet". Below, the wording "regular sheet" may be used in place of "recording sheet with a standard size". In the United States, the standards for sheet size differ from those of Japan; for example, Letter size is (8.5×11 inches) and (215.9×279.4 millimeters) when expressed in millimeters.

In a case where sorting priority mode is not set, for example, in a case where a print job in which the user designates a recording sheet with a standard size is continuously designated, recording sheets with a standard size and recording sheets with a non-standard size are given a sortable sheet feed configuration, thereby setting the sorting in a case where a recording sheet is not mounted on the sheet tray of the printing device 2 in both of the longitudinal and lateral sheet feed directions, a recording sheet with a non-standard size with one size of the longitudinal and lateral of the recording sheet with a standard size and the corresponding other size of the longitudinal and lateral is mounted on different sheet trays of the printing device 2 with different sheet feed directions.

There are cases where a recording sheet with both sheet feed directions of the longitudinal direction and the lateral direction is not supported depending on the printing device 2, for example, a B5 sheet in the lateral direction is treated as a standard size (regular sheet) and a B5 sheet in the longitudinal direction (portrait on a sheet tray as 182×257) is treated as a non-standard size (irregular sheet) in a case where only the lateral direction (landscape on a sheet tray as 257×182) of B5 is supported.

Although the sorting setting unit 304 performs setting of the sorting according to each situation in the print job, as described above, in particular, in a case where the sorting priority mode setting unit 300 sets the sorting priority mode, setting of sorting is performed permitting not only a recording sheet with the same size as the size of the recording sheet designated by the current print job, but also a recording sheet such as with a difference from the size of the recording sheet designated by the current print job is within the predetermined range. When the operation of the printing system is described, setting of the sorting will be described using specific examples.

The printing data generator 305 subjects printing data in print job information of the print job designated by the user received by the printing information acquiring unit 302 to conversion processing into printing information printable by the printing device 2.

The printing control information generator 306 generates control information that controls the execution of a print job of the printing device 2 from the information of the print job received by the printing information acquiring unit 302 or the sorting settings set by the sorting setting unit 304.

The sorting information notification unit 307 notifies each terminal device 4a, 4b, and 4c of the information on sorting representing the sortable sheet feed configuration set by the sorting setting unit 304. By displaying the sorting information received by the terminal devices 4a, 4b, and 4c on the display, the user is able to identity the sortable configuration.

The printing instruction unit 308 transmits the printing information generated by the printing data generator 305 and the printing control information generated by the printing control information generator 306 to the printing device 2, and outputs the printing instruction to the printing device 2. Accordingly, the printing device 2 performs printing using the recording sheet for which the sortable sheet feed configuration by the sorting setting unit 304 is set and sorting is executed.

The memory 31 accommodates a printing control program 310, sheet information 311, printing information 312, sorting information 313, and the like.

The printing control program 310 is a program that causes the controller 30 to operate as each of the above-described units 300 to 308. The operation of the program will be described in detail using a flowchart.

The printing information 311 is information on size and sheet feed direction of the recording sheet mounted on the sheet tray of the printing device 2 or information on the size and sheet feed direction of the recording sheet output by the printing device 2 with the previously performed print job, and setting of the sorting can be performed according to the information.

The printing information 312 is information on the printing data in which the user instructs printing through the terminal devices 4a, 4b, and 4c, or the print job that includes the size of the recording sheet.

The sorting information 313 is information on the sorting set by the sorting setting unit 304, and is information for instructing the printing device 2 to perform printing using a recording sheet with whichever sheet feed direction or size.

(Operation of Printing System)

Next, the action of the exemplary embodiment will be described following the flowchart.

Figure 3:
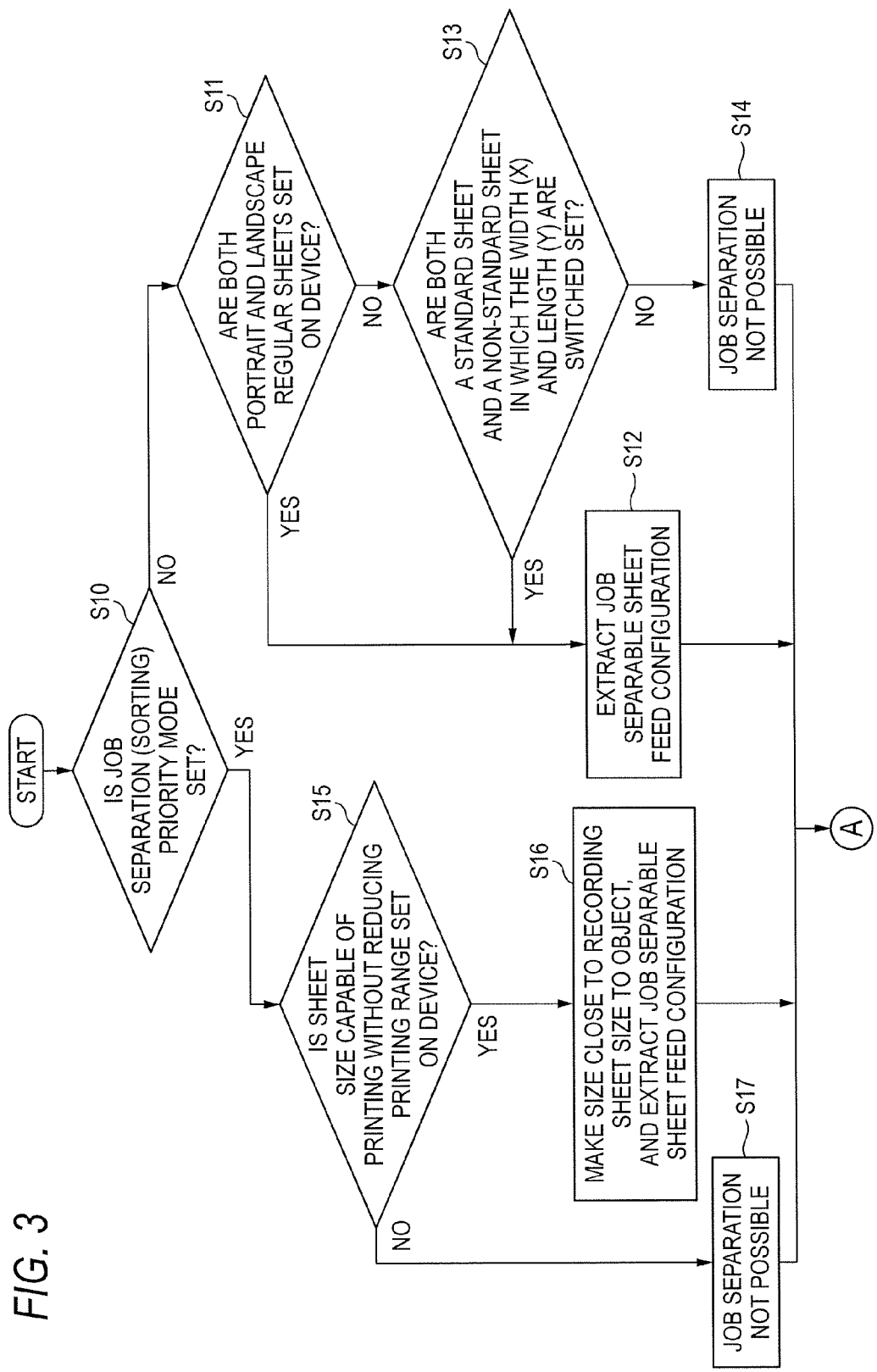
FIG. 3 is a flowchart illustrating an example of an operation of the printing system as an action of the exemplary embodiment.
Figure 4:
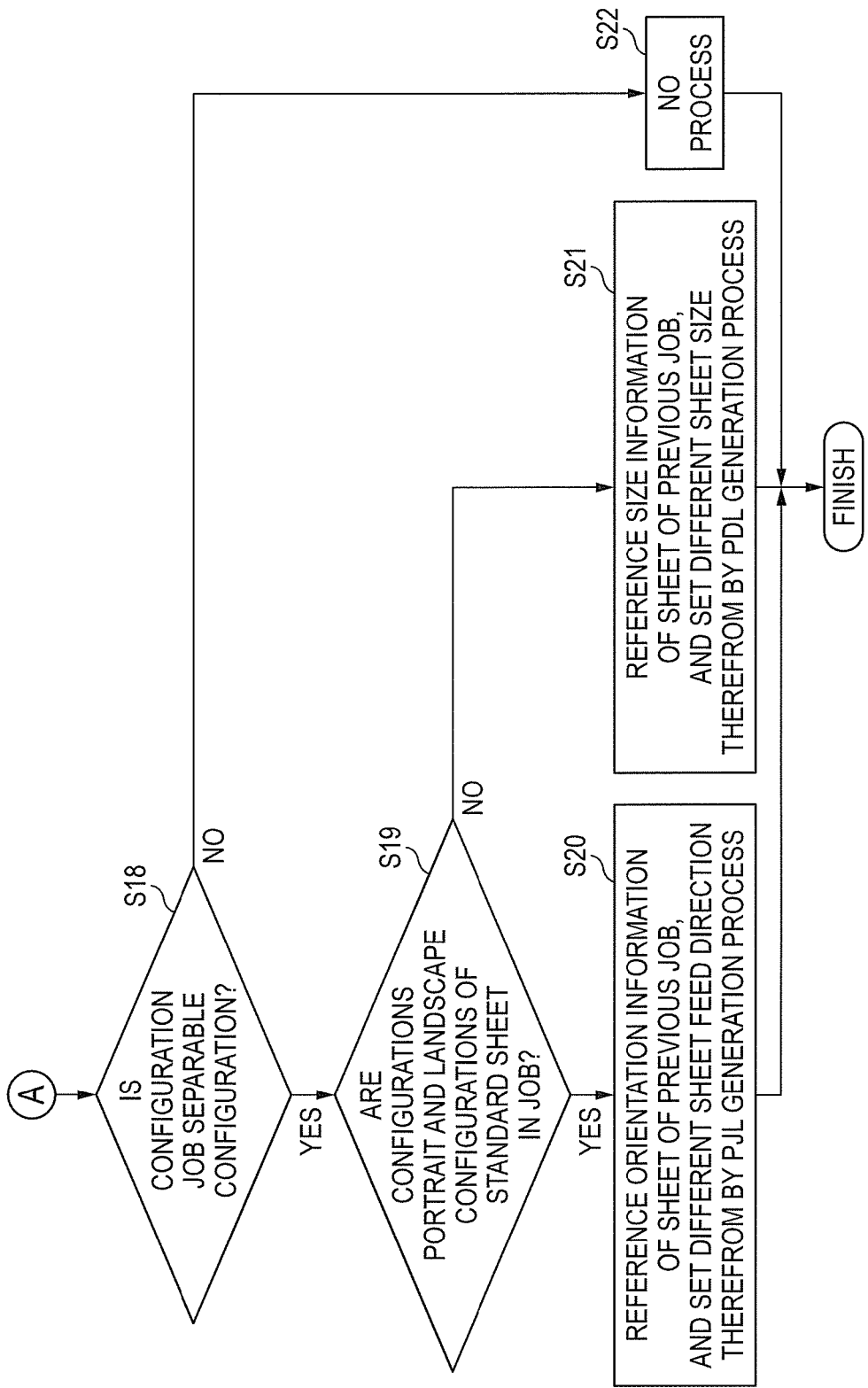
FIG. 4 is a flowchart illustrating an example of an operation of the printing system.

FIGS. 3 and 4 are flowcharts illustrating an example of the operation of the printing system as the action of the exemplary embodiment. In particular, FIG. 3 is a flowchart that represents a process up to the setting of the sorting, and FIG. 4 is a flowchart representing a process that sets information necessary to the sorting process in the printing device 2 based on the sortable sheet feed configuration.

(1) Setting Operation of Sorting

First, a manager performs setting of the sorting priority mode while operating the printing control device 3 which is a higher order host before each user transmits the print job from the respective terminal devices 4a, 4b, and 4c to the printing control device 3. The wording "sorting of the recording sheet" refers to sorting recording sheets on the exit tray by switching the sheet feed direction of the recording sheet longitudinally and laterally for each predetermined printing unit, for example, for each print job so as to create a distinction between each print job even in a case where recording sheets with the same size are output to the exit tray continuously in the printing device 2.

In particular, the sorting priority mode (job separation priority mode) is a mode in which permitting and sorting recording sheets such that the difference in the sizes of the recording sheets designated by the print jobs is within a predetermined range is prioritized when sorting the recording sheets (job separation) in the printing device 2 for each predetermined printing unit such as for each print job. That is, even in a case where a recording sheet with the same size as the size of the recording sheet designated by the user is not mounted on the printing device 2 combining the sheet feed direction of the longitudinal direction and the lateral direction, the sorting priority mode is a mode in which variance in certain sizes of the recording sheet is permitted, and sorting is performed using the recording sheet in which the difference from the size of the recording sheet designated by the user is within a predetermined range.

When the user performs communication with the printing control device 3 in order to transmit the print job from the terminal devices 4a, 4b, and 4c (below, simply referred to as terminal device 4), the sorting information is transmitted to the terminal device 4 by the sorting information notification unit 307 of the printing control device 3 and is displayed on the display of the terminal device 4. Accordingly, it is possible for the user to recognize whether the manager set the sorting priority mode.

Figure 5:
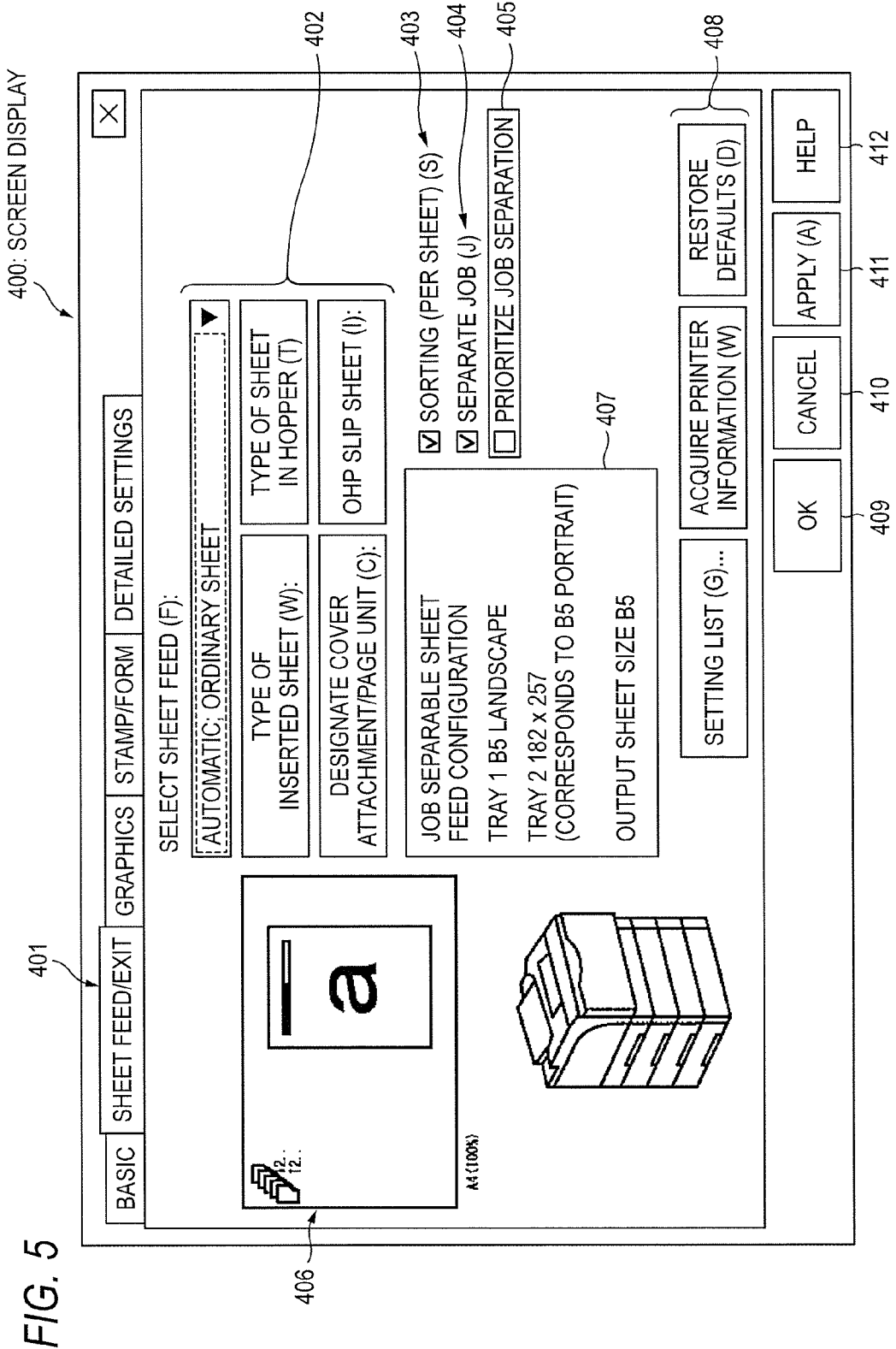
FIG. 5 is an example of a display screen of sorting information displayed on a display of a terminal device by a sorting information notification unit.

FIG. 5 is an example of a display screen of sorting information displayed on a display of a terminal device 4 by a sorting information notification unit 307. The display screen 400 displays the sorting information and represents a job separable sheet feed configuration in a state where the upper sheet feed/exit button 401 is pushed. A sheet feed selection button 402 that selects automatic sheet feed or manual feed and the type of sheet when manual feed is included on the upper right side, and on the lower side, a sort selection button 403, a job separation button 404, and a job separation priority selection button 405 are disposed. If a check is entered in the square of the job separation priority selection button 405, the sorting priority mode is set. Since a check is not entered on the display screen 400, the sorting priority mode is not set (sorting priority mode is OFF).

A display field 406 that indicates the status of the print job is disposed on the upper left side of the display screen 400, and a display field 407 that indicates the job separable sheet feed configuration is disposed in the center of the display screen 400. Buttons 408 such as for a setting list or printer information acquisition are disposed on the lower side thereof. An OK button 409 for closing the screen while the settings are reflected, a cancel button 410 for canceling the setting, an apply button 411 for reflecting the settings and leaving the display screen as is, and a help button 412 for obtaining necessary information on the settings are disposed on the lowest side.

The user designates the size of the recording sheet and transmits the print job from the terminal device 4 to the printing control device 3. The printing control device 3 first determines whether the sorting priority mode is set when the print job is received (S10).

(1-1) Operation in Case Where Sorting Priority Mode is OFF

In a case where the sorting priority mode is not set (S10: NO), it is determined whether a regular sheet is mounted on the sheet tray of the printing device 2 in both of the portrait and landscape sheet feed directions (S11). That is, the sheet determining unit 303 determines whether a regular sheet is mounted on the printing device 2 in two different sheet feed directions of the longitudinal direction and the lateral direction based on the recording sheet information stored in the sheet information 311 of the memory 31 acquired by the sheet information acquiring unit 301.

FIG. 6 is a drawing illustrating an example of a sheet feed configuration. In Example 1 in FIG. 6, A4 sheet is mounted in the landscape orientation on the tray 1 of the sheet trays of the printing device 2, A4 sheet is mounted in the portrait orientation is mounted on the tray 2, and B4 sheet is mounted in the portrait orientation on the tray 3. Accordingly, in the printing device 2, A4 sheet that is a regular sheet is mounted on the printing device 2 in both of the longitudinal and lateral sheet feed directions. It should be noted that the sorting priority is OFF in Example 1, and the sorting priority mode is not set.

In a case where the regular sheet is mounted on the sheet tray of the printing device 2 in both of the portrait and landscape sheet feed directions (S11: YES), the sortable sheet feed configuration (job separable) is set by the sorting setting unit 304 (S12).

The sorting setting unit 304 determines the combination of sortable sheets based on the recording sheet sizes of the sheet information 311 and the printing information 312. At this time, the information on the recording sheet size designated by the user with the print job is stored in the printing information 312 of the memory 31 acquired by the printing information acquiring unit 302. In Example 1 in FIG. 6, the recording sheet size designated by the user is A4, and the combination of sortable recording sheets (sortable sheet feed configuration) is the combination of the A4 landscape in tray 1 and the A4 portrait in tray 2 from the sheet feed configurations of the printing device 2. If a sortable sheet feed configuration is set, the process transitions to the process in the flowchart in FIG. 4.

In a case where the regular sheet is not mounted on the sheet tray of the printing device 2 in both of the portrait and landscape sheet feed directions (S11: NO), it is determined whether both a regular sheet a recording sheet with a size in which the width (X) and the length (Y) are switched are mounted on the sheet tray of the printing device 2 (S13). As described above, in a case where the regular sheet is supported by the printing device 2 in only a given sheet feed direction, the recording sheet with a size in which the width (X) and the length (Y) of the regular sheet are switched is treated as an irregular sheet.

In the case of Example 2 in FIG. 6, B5 sheet is mounted on the tray 1 of the sheet tray of the printing device 2 in landscape orientation (257×182 millimeters) an irregular sheet (182×257 millimeters) is mounted on the tray 2 with the length direction as the longitudinal direction, and A4 sheet is mounted on the tray 3 in the portrait orientation. Accordingly, B5 sheet that is a regular sheet in the landscape orientation, and an irregular sheet with a size in which the width and length of the B5 sheet that is a regular sheet are switched corresponding to the portrait orientation of the B5 sheet are respectively mounted on the printing device 2. It should be noted that the sorting priority is OFF in Example 2, and the sorting priority mode is not set (S13).

In a case where both the regular sheet and an irregular sheet with a size in which the width (X) and length (Y) of the regular sheet are switched are mounted on the sheet tray of the printing device 2 (S13: YES), a sortable sheet feed configuration (job separable) is set (S12).

The sorting setting unit 304 determines the combination of sortable sheets based on the recording sheet sizes of the sheet information 311 and the printing information 312. In Example 2 in FIG. 6, the recording sheet size designated by the user is B5, the combination of recording sortable sheets is the combination of the B5 landscape orientation on tray 1 and the irregular sheet (182×257 millimeters) corresponding to the B5 portrait on tray 2 from the sheet feed configurations of the printing device 2. If a sortable sheet feed configuration is set, the process transitions to the process in the flowchart in FIG. 4.

The sorting information notification unit 307 notifies the terminal device 4 of the sorting information 313 that includes the sortable sheet feed configuration or the like, and the sorting information 313 is displayed on the display of the terminal device 4.

FIG. 5 illustrates an example of the display screen of the sorting information displayed on the display of the terminal device 4 for the above-described example 2 of FIG. 6. As illustrated in FIG. 5, the sortable sheet feed configuration set by the sorting setting unit 304, that is the combination of B5 portrait on tray 1 and the irregular sheet (182×257 millimeters) corresponding to B5 portrait on tray 2 and the designated recording sheet size (output sheet size) B5 are displayed in the display field 407 that represents the job separable sheet feed configuration in the center of the display screen 400. Thereby, it is possible for the user to easily ascertain the sortable recording sheets.

In a case where both the regular sheet and an irregular sheet with a size in which the width (X) and length (Y) of the regular sheet are switched are not mounted on the sheet tray of the printing device 2 (S13: No), sorting (job separation) is disabled, and the process transitions to the process of the flowchart in FIG. 4 (S14).

(1-2) Operation in Case Where Sorting Priority Mode is ON

In a case where the sorting priority mode is set in the flowchart in FIG. 3 (S10: YES), it is determined whether a recording sheet with a printable size without reducing the printing range is mounted on the sheet tray of the printing device 2 (S15). That is, the sheet determining unit 303 determines whether a recording sheet with a printable size without reducing the printing range is mounted on the printing device 2 even in a case where the same recording sheet size as the recording sheet size designated by the user with the print job is not present, based on the sheet information 311.

In a case where the sheet determining unit 303 determines that a recording sheet with a printable size without reducing the printing range is mounted on the printing device 2 (S15: YES), the sorting setting unit 304 sets the recording sheet so that the difference from the size of the recording sheet designated by the print job to be within a predetermined range with a recording sheet with a printable size without reducing the printing range as the sortable sheet feed configuration (S16).

FIG. 7 is a drawing illustrating another example of the sheet feed configuration. In Example 3 in FIG. 7, A4 sheet is mounted in the landscape orientation on the tray 1 of the sheet trays of the printing device 2, Letter size sheet is mounted in the landscape orientation is mounted on the tray 2, and A5 sheet is mounted in the portrait orientation on the tray 3. In contrast to the A4 size being (210×297 millimeters), Letter size is approximately (216×279 millimeters), or A5 size is (148×210 millimeters). Accordingly, in this case, a Letter size sheet that is a size such that the difference from the A4 size as described above is within a predetermined range is mounted on the printing device 2. The sorting priority is ON in Example 3, and the sorting priority mode is set.

In Example 4 in FIG. 7, B5 sheet is mounted in the landscape orientation (that is, 257×182 millimeters) on the tray 1 of the sheet trays of the printing device 2, a non-standard recording sheet is mounted at (a state of (260×190 millimeters)) is mounted on the tray 2, and B4 sheet is mounted in the portrait orientation on the tray 3. Accordingly, in Example 4, a recording sheet with a non-standard form such that the difference between a B5 sheet and the recording sheet size is within a predetermined range (for example, the average error of the longitudinal and lateral is within 20 millimeters, or in this case, the predetermined range may be within 10 millimeters) is mounted on the printing device 2. The sorting priority is ON in Example 4 as well, and the sorting priority mode is set.

The sorting setting unit 304 sets the combination of sortable sheets based on the recording sheet sizes of the sheet information 311 and the printing information 312 (S16). In Example 3 in FIG. 7, the recording sheet size designated by the user is A4, and the combination of sortable recording sheets is the combination of the A4 landscape in tray 1 and the Letter size landscape in tray 2 from the sheet feed configurations of the printing device 2. In Example 4, the recording sheet size designated by the user is B5, and the combination of sortable recording sheets is the combination of B5 landscape in tray 1 and the non-standard recording sheet of (260×190 millimeters) in tray 2 from the sheet feed configurations of the printing device 2. If a sortable sheet feed configuration is set in this way, the process transitions to the process in the flowchart in FIG. 4.

In a case where the sheet determining unit 303 determines that a recording sheet with a printable size without reducing the printing range is not mounted on the printing device 2 (S15: NO), sorting is disabled, and the process transitions to the process of the flowchart in FIG. 4 (S17).

(2) Operation Setting Sorting Process on Printing Device

Below, the operation that sets the sorting process in the printing device 2 will be described following the flowchart in FIG. 4.

First, it is determined whether a sortable sheet feed configuration is set (S18). This is performed by the printing control information generator 306 based on the sorting information 313 set by the sorting setting unit 304. In a case where it is determined that a sortable sheet feed configuration is set (S18: YES), it is determined whether the sortable sheet feed configuration is a configuration of the portrait orientation and the landscape orientation of the regular sheet in the print job (S19).

In a case where the sortable sheet feed configuration is a configuration of the portrait orientation and the landscape orientation of the regular sheet in the print job (S19: YES), the control data that instructs a different sheet feed direction to the sheet feed direction of the recording sheet in the previous print job is generated in the printing control information generator 306 by a printer job language generation process as printer job language (PJL) (S20).

In a case of a sheet feed configuration in which the same size of regular sheet is present in both of the portrait and landscape sheet feed directions, the designation of the portrait orientation and the landscape orientation with respect to the printing device 2 is switched for each print job, thereby outputting the print instruction. In a case of other sheet feed configurations, the designation of the recording sheet size with respect to the printing device 2 is switched for each print job, thereby sorting is performed.

That is, Example 1 in FIG. 6 is a case of a portrait and landscape sheet feed configurations of regular sheets with the same size of A4, and, for the job 1, if the previous print job has a sheet feed direction of A4 portrait, the print instruction for the job 1 is output to the printing device 2 as the A4 landscape sheet feed direction. For the job 2, since the previous print job (that is, job 1) has a sheet feed direction of A4 landscape, the print instruction for job 2 is output to the printing device 2 as the sheet feed direction of A4 landscape.

In Example 2 in FIG. 6, if there is a case where there is a sheet feed configuration of B5 landscape and a recording sheet corresponding to B5 portrait (182×257 millimeters), and the sheet feed direction of previous print job is B5 landscape, a print instruction for job 1 corresponding to B5 portrait (182×257 millimeters) is output and the print instruction for job 2 corresponding to B5 landscape is output.

In Example 3 in FIG. 7, if there is a case where there is a sheet feed configuration of A4 landscape and Letter landscape, and the sheet feed direction of previous print job is A4 landscape, a print instruction for job 1 corresponding to Letter landscape is output and the print instruction for job 2 corresponding to A4 landscape is output. In Example 4, if there is a case where there is a sheet feed configuration of B5 landscape and an irregular sheet (260×190 millimeters), and the sheet feed direction of previous print job is B5 landscape, a print instruction for job 1 corresponding to the irregular sheet (260×190 millimeters) is output and the print instruction for job 2 corresponding to B5 landscape is output.

In a case where the sortable sheet feed configuration is not a configuration of portrait orientation and landscape orientation of the regular sheet in the print job (S19: NO), print data for a separate recording sheet size is generated with reference to the information on the recording sheet size in the previous print job by a page markup language generation process with page description language (PDL) as the language processable by the printing device 2 (S21), in the printing data generator 305.

In a case where the sortable sheet feed configuration is not set (S18: NO), printing is performed as is without adding a special process aimed as the sorting process (S22).

The printing control device, printing data and the like that includes the sheet feed direction generated in this way is sent to the printing device 2 by the printing instruction unit 308, and sorting of the printing and recording sheets is performed in the printing device 2 in light of this information. It should be noted that, in the exemplary embodiments described above, although recording sheets such as A4, B5, and Letter size are used as specific examples, it is possible to apply the invention with respect to a return postcard or the like, and for sorting to be performed.

MODIFICATION EXAMPLE

Figure 8:
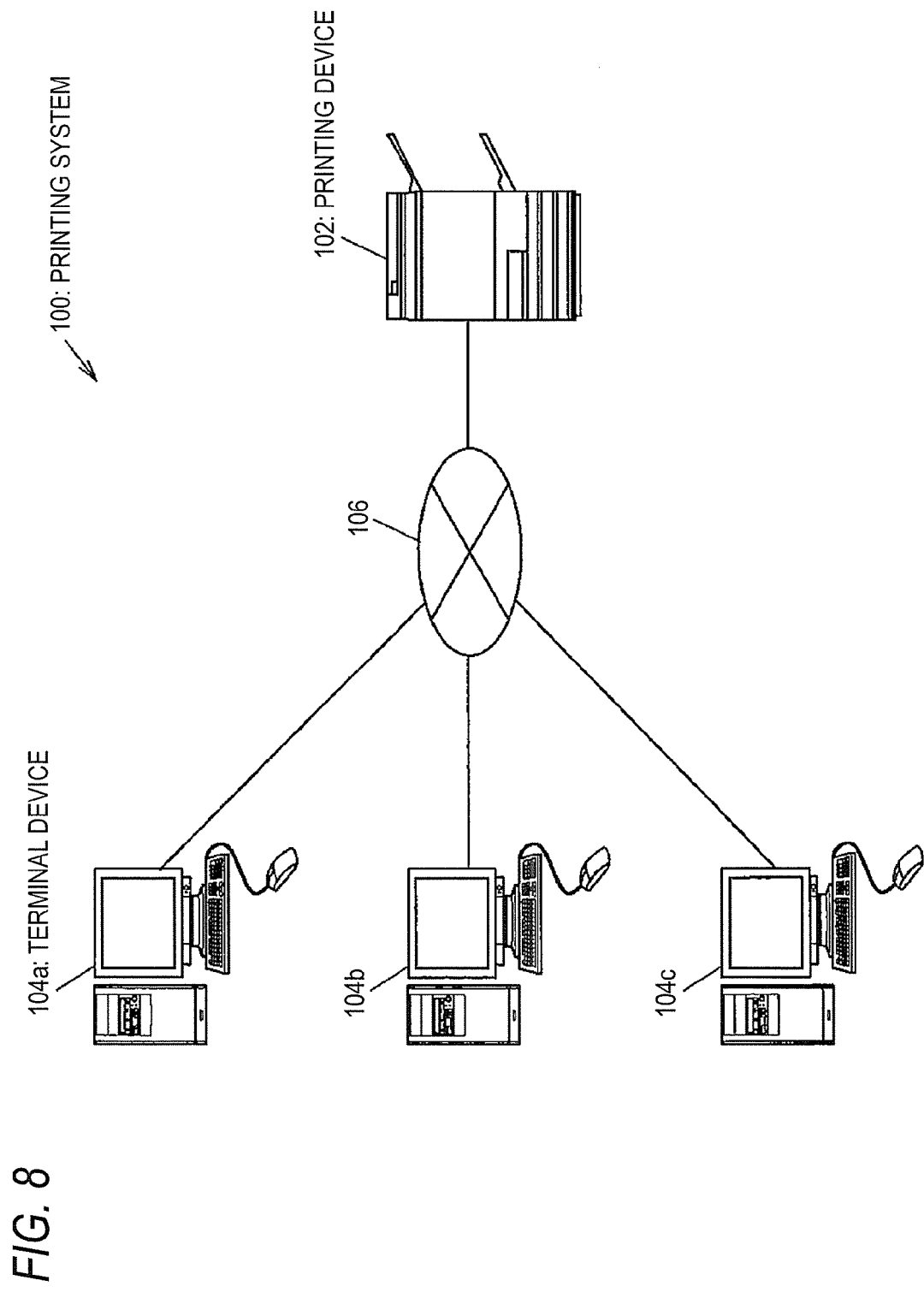
FIG. 8 is a schematic diagram illustrating a modification example of the printing system.

Next, a modification example of the printing system of the invention will be described. FIG. 8 is a schematic diagram illustrating a modification example illustrating a modification example of the printing system.

Plural terminal devices 104a, 104b, and 104c in the printing system 100 of the modification example illustrated in FIG. 8 are formed connected to the printing device 102 via the network 106. Here, the network 106 is a communication line network used for performing information communication between the terminal devices 104a, 104b, and 104c and the printing device 102. It is possible to use a LAN or the Internet as the network 106.

Because the printing system 100 of the modification example does not include a server device in the above-described exemplary embodiment, each terminal device 104a, 104b, and 104c includes a function of a printing control device 3 in the above-described exemplary embodiments, and setting of sorting is performed in each terminal device 104a, 104b, and 104c.

Since each terminal device 104a, 104b, and 104c acquires information such as the sheet feed direction of the recording sheet output from the printing device 102 with the previous print job, setting of sorting is suitably prepared in each terminal device 104a, 104b, and 104c.

Effects of the Exemplary Embodiment

Although it is only possible for the related art to sort (job separation) with a sheet feed configuration of A4 portrait orientation and landscape orientation, according to the above-described exemplary embodiments, it is possible to sort sheet sizes such as a return postcard in addition to B5, A5, and Letter with a printing device that treats only one of portrait and landscape orientations as the regular sheet.

According to the exemplary embodiment, even in a case where a recording sheet with a size designated by the print job is not mounted on the printing device, it is possible to instruct a printing device so that sorting is performed using a recording sheet with a size such that the difference in the sizes of the recording sheet s is within a predetermined range.

According to the exemplary embodiments, because it is possible to perform notification and display of the configuration of sortable recording sheets from the printing control device to each terminal device, it is possible for the user to ascertain the recording sheets able to be sorted and the situation of the sorting.

It should be noted that the invention is not limited to the exemplary embodiment described above, and various modifications are possible without departing from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a printing control program causing a computer to execute functions of:
   a printing information acquiring unit that acquires printing information that includes a size of a recording sheet from a print job;
   a sheet information acquiring unit that acquires information on a size and a sheet feed direction of the recording sheet mounted on a printing device and information on a size and a sheet feed direction of the recording sheet output from the printing device according to a previous print job from the printing device; and
   a setting unit that sets a sorting priority mode that causes the printing device to perform:
   determining sheet trays mounted on the printing device, on which recording sheets having printable sizes being equal to or larger than a printing range designated by a current print job are mounted, in a case where the recording sheet output according to the previous print job has a size different from a first size of a recording sheet designated by the current print job;
   setting one of the sheet trays on which the recording sheet having a second size as a feeding tray, wherein a difference between the first size of a recording sheet designated by the current print job and the second size is within a predetermined range;
   printing using the recording sheet on the feeding tray; and
   outputting the printed recording sheet in a sheet feed direction different from the sheet feed direction of the recording sheet of the previous print job.

2. The non-transitory computer readable medium storing a printing control program according to claim 1, wherein in a case where the sorting priority mode is not set,
the printing information acquiring unit continuously receives print job information in which the recording sheet having a standard size is designated, and
the printing device performs:
judging whether recording sheets each having the standard size are mounted on sheet trays mounted on the printing device in both longitudinal and lateral sheet feed directions;
judging whether a recording sheet having a non-standard size in which one of the lateral and longitudinal lengths is the same as one of the lateral and longitudinal lengths of the standard size is mounted on any one of the sheet trays in case where the recording sheet having the standard size is mounted in only one of longitudinal and lateral sheet feed directions; and
printing using the recording sheet having the standard size and the recording sheet having the non-standard size in case where the recording sheet having the non-standard size is mounted.

3. The non-transitory computer readable medium storing a printing computer program according to claim 1, causing the computer to further function as a sorting information notification unit that notifies a terminal device side of information on sorting in each of a case where the sorting priority mode is set and a case where the sorting priority mode is not set by the setting unit.

4. A printing control method, comprising:
acquiring printing information that includes a size of a recording sheet from a print job;
acquiring information on a size and a sheet feed direction of the recording sheet mounted on a printing device and information on a size and a sheet feed direction of the recording sheet output from the printing device according to a previous print job from the printing device; and
setting a sorting priority mode that causes the printing device to perform:
determining sheet trays mounted on the printing device, on which recording sheets having printable sizes being equal to or larger than a printing range designated by a current print job are mounted, in a case where the recording sheet output according to the previous print job has a size different from a first size of a recording sheet designated by the current print job;
setting one of the sheet trays on which the recording sheet having a second size as a feeding tray, wherein a difference between the first size of a recording sheet designated by the current print job and the second size is within a predetermined range;
printing using the recording sheet on the feeding tray; and
outputting the printed recording sheet in a sheet feed direction different from the sheet feed direction of the recording sheet of the previous print job.

5. A printing control device, comprising:
a printing information acquiring unit that acquires printing information that includes a size of a recording sheet from a print job;
a sheet information acquiring unit that acquires information on a size and a sheet feed direction of the recording sheet mounted on a printing device and information on a size and a sheet feed direction of the recording sheet output from the printing device according to a previous print job from the printing device; and
a setting unit that sets a sorting priority mode that causes the printing device to perform:
determining sheet trays mounted on the printing device, on which recording sheets having printable sizes being equal to or larger than a printing range designated by a current print job are mounted, in a case where the recording sheet output according to the previous print job has a size different from a first size of a recording sheet designated by the current print job;
setting one of the sheet trays on which the recording sheet having a second size as a feeding tray, wherein a difference between the first size of a recording sheet designated by the current print job and the second size is within a predetermined range;
printing using the recording sheet on the feeding tray; and
outputting the printed recording sheet in a sheet feed direction different from the sheet feed direction of the recording sheet of the previous print job.

6. A printing system, comprising:
the printing control device according to claim 5;
at least one terminal device connected to the printing control device; and
a printing device that performs printing and sorting of the recording sheet based on instructions from the printing control device.

* * * * *